United States Patent [19]
Mayher

[11] 3,824,374
[45] July 16, 1974

[54] CONDITION RESPONSIVE DISCONNECT ARRANGEMENT FOR ELECTRICAL COOKING EQUIPMENT

[76] Inventor: Edward J. Mayher, 13672 Cherokee Trl., Middleburgh Heights, Ohio 44130

[22] Filed: May 10, 1973

[21] Appl. No.: 359,079

Related U.S. Application Data

[63] Continuation-in-part of Ser. No. 143,015, May 13, 1971, abandoned.

[52] U.S. Cl.................. 219/510, 169/1 A, 219/490
[51] Int. Cl. ............................................. H05b 1/02
[58] Field of Search............ 169/1 R, 1 A; 219/490, 219/510, 511, 517, 507; 317/16; 337/150

[56] References Cited
UNITED STATES PATENTS

| | | | |
|---|---|---|---|
| 3,412,356 | 11/1968 | Van Horssen | 337/150 |
| 3,463,233 | 8/1969 | Haessler | 169/1 R |
| 3,717,793 | 2/1973 | Peterson | 219/517 X |
| 3,731,248 | 5/1973 | Plasko et al. | 219/517 X |

Primary Examiner—J. D. Miller
Assistant Examiner—Fred E. Bell
Attorney, Agent, or Firm—Meyer, Tilberry & Body

[57] ABSTRACT

A condition responsive arrangement is provided which includes a normally closed safety control circuit in series with and between a thermostat element in an electric cooking range and a coil-controlled contactor through which the heating element of the range is energized. The thermostat, safety circuit and contactor are connected across a power source and the contactor operates when energized to connect the heating element across the power source. The safety circuit includes a normally closed switch located remotely of the range and actuated in response to a sensed abnormal condition exteriorly of the range to open the safety circuit and thus the electrical circuit to the coil-controlled contactor, thereby removing the heating element of the range from the power source.

12 Claims, 2 Drawing Figures

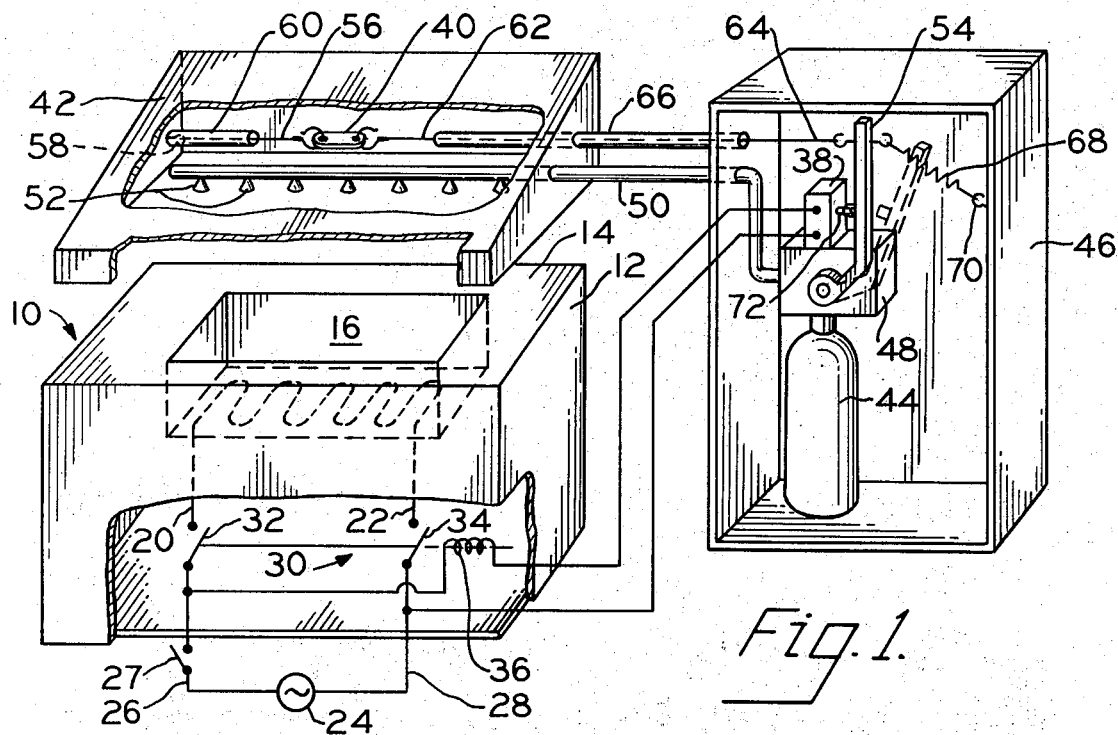

CONDITION RESPONSIVE DISCONNECT ARRANGEMENT FOR ELECTRICAL COOKING EQUIPMENT

This application is a continuation-in-part of my copending application Ser. No. 143,015 filed May 13, 1971, now abandoned.

This application relates to the art of electrical cooking equipment and, more particularly, to an abnormal condition responsive circuit for disconnecting the heating element of such equipment from its power source.

The invention is particularly applicable to commercial electrical cooking equipment and will be described with particular reference thereto. However, it will be appreciated that the invention has broader applications, such as to any commercial or private electrical cooking equipment where it is highly desirable to remove the equipment from a power source in case of a fire or other emergency condition.

In commercial electrical cooking equipment, the main power supply to the electrically energized heating element or elements generally passes through a thermostat, and then to a coil-controlled contactor. The contactor, when closed, connects the heating elements across the power source, and the contactor coil must be electrically energized from the power source in order for the power to be supplied to the heating elements. Fire extinguishing systems are required in conjunction with commercial establishments in which cooking takes place, and The National Fire Code requires that the operation of any extinguishing system in a commercial dwelling shall include automatic shut off of all sources of fuel and heat to all cooking elements. Therefore, in commercial establishments utilizing electrical cooking equipment, the electric heating elements must be completely disconnected automatically from the power source.

Heretofore, the code requirements have been met by utilizing an electrical circuit which is independent of the internal circuitry of the cooking equipment. Such previous circuits are operably connected to the electrically controlled contactor of the range and to a power source separate from that of the cooking equipment. The independent circuit cooperates with the extinguishing system to connect the separate power source with the contactor to de-actuate the coil-controlled contactor and thereby de-energize the heating elements. Such independent control circuits are both difficult and expensive to install and maintain as a result of the requirement of a separate power source therefor, together with expensive electrical components, such as circuit breakers.

The present invention contemplates a new and improved safety control arrangement which overcomes all of the above problems and others, and provides an extremely simple electrical circuit which is economical, easy to install and maintain, and which is readily adaptable to cooperate with existing or currently available electrical cooking equipment, and with fire extinguishing systems associated with existing or currently available commercial equipment.

In accordance with the present invention, a normally closed electrical safety circuit is connected across the power supply for the cooking equipment in series with an electrically actuable contactor controlling connection of the heating element or elements of the equipment across the power supply. The contactor, under normal operating conditions of the equipment, is energized through the safety circuit to connect the heating elements of the cooking equipment across the power supply. In the event of an abnormal condition exteriorly of the cooking equipment, such as a fire, the normally closed circuit is opened. Opening of the safety circuit de-energizes the contactor, whereby the heating elements are disconnected from the power supply.

In accordance with one aspect of the invention, the safety circuit includes a normally closed switch controlled by a condition sensing device so as to open the circuit from the power supply to the electrically actuable contactor. The sensing device is adapted to sense an abnormal, potentially dangerous condition exteriorly of the range such as, for example, excessive smoke, heat or fire. When such an abnormal condition is sensed, the safety circuit switch is opened to deactuate the controlled contactor, whereby the heating elements of the cooking equipment are disconnected from the power supply. Since the safety control circuit is in series with the contactor, the contactor and thus the heating elements of the cooking equipment cannot be again energized until the safety circuit switch is closed.

In accordance with another aspect of the invention, the safety circuit switch is advantageously associated with fire extinguishing apparatus controlled by the sensing device. The switch is actuated to open the safety circuit by a mechanism which operates simultaneously to actuate the fire extinguishing apparatus and which mechanism is motivated when the abnormal condition is sensed.

In accordance with a further aspect of the invention, the safety circuit switch is located remotely of the cooking apparatus and connected in series with the internal control circuitry of the apparatus by a conductor and disconnect coupling arrangement. This advantageously provides for the switch to be operatively associated with existing cooking equipment in a minimum amount of time and with minimum expense. Moreover, the disconnect coupling arrangement facilitates minimizing maintenance time and costs in connecting and disconnecting the safety circuit from the cooking equipment such as when, for example, maintenance or replacement of the cooking equipment is required.

The principal object of the invention is to provide a simple, inexpensive safety control circuit for commercial electrical cooking equipment.

Another object is the provision of a safety control circuit of the above character which is employed in conjunction with the main power supply for the cooking apparatus and independent of any separate power supply.

A further object is the provision of a safety control circuit of the foregoing character through which the energization of the heating elements of the cooking apparatus is controlled and which is actuated in response to a sensed abnormal condition exteriorly of the equipment to disconnect the heating elements from the power source.

Still a further object of the invention is to provide a simple and inexpensive safety control circuit for commercial electrical cooking equipment which can be readily installed in existing equipment and is easy to maintain.

Further, it is an object of the invention to provide a safety control circuit for electrical cooking apparatus which is extremely simple to install for operative association with a fire extinguishing system for the apparatus.

The invention may take physical form in certain parts and arrangements of parts, a preferred embodiment of which is described in detail in this specification and is illustrated in the accompanying drawings which form a part hereof, and wherein:

FIG. 1 is a perspective view of electrical cooking equipment incorporating the electrical safety control circuit of the invention in cooperation with a fire extinguishing system for the equipment; and, FIG. 2 is a schematic circuit diagram depicting the safety control circuit in conjunction with a particular range circuit.

Referring now to the drawings wherein the showings are for the purpose of illustrating a preferred embodiment of the invention only, and not for the purposes of limiting same, the figures show an external safety control circuit for disconnecting the heating elements of electrical cooking equipment from the main power source for the equipment.

Referring to FIG. 1 of the drawing, cooking apparatus 10 is in the form of a deep fat fryer and is comprised of a suitable housing 12 having a top 14 provided with a grease vat 16 adapted to receive cooking oil or the like in which food products are to be immersed for frying. As illustrated schematically, the cooking apparatus includes an electric resistance-type heating element 18 operatively associated with vat 16 to heat the liquid contents thereof. It will be appreciated that more than one such heating element may be associated with the cooking apparatus. The opposite ends 20 and 22 of heating element 18 are adapted to be connected to an external source of electricity 24 through corresponding conductors 26 and 28 and an electrically actuable contactor device 30 comprised of switch arms 32 and 34 which are suitably interconnected for simultaneous movement between open and closed positions with respect to ends 20 and 22 of heating element 18. Contactor device 30 includes a coil 36 adapted, when energized, to displace switch arms 32 and 34 to the closed positions thereof with respect to ends 20 and 22 of the heating element, whereby the heating element is connected across power supply 24. When coil 36 is de-energized, switch arms 32 and 34 are displaced to open the circuit from power supply 24 to heating element 18. As set forth more fully hereinafter, a coil-controlled contactor of the foregoing character is generally included in the standard circuitry of commercial cooking apparatus. It will be appreciated that the cooking apparatus is provided with an on-off control switch such as switch 27 in line 26 which is actuated manually to connect the apparatus to the power supply during periods of use of the apparatus and to disconnect the apparatus during periods of non-use.

In accordance with the present invention, coil 36 of contactor device 30 is connected across power source 24 in series with a safety control switch 38. Switch 38 is normally closed, whereby coil 36 is normally energized or energizable to actuate switch arms 32 and 34 to the closed positions thereof for electrical power to be supplied to heating element 18. Switch 38 is adapted to be actuated to its open position in response to the sensing of an adverse condition exteriorly of cooking apparatus 10, as set forth more fully hereinafter. When switch 38 opens, the circuit to coil 36 is interrupted.

Assuming switch 27 to be closed and the heating element energized when the circuit to coil 36 is interrupted, the coil is de-energized, whereby switch arms 32 and 34 open the circuit between heating element 18 and power supply 24. Accordingly, heating element 18 is disconnected from the power source until such time as switch 38 is again closed.

The purpose of switch 38 is to assure disconnection of heating element 18 from the power supply upon the occurrence of an adverse, potentially dangerous condition exteriorly of cooking apparatus 10, such as excessive smoke, heat or fire. In the embodiment illustrated, such an adverse condition is adapted to be sensed by a sensing element 40 positioned in hood 42 which is supported above cooking apparatus 10. It will be appreciated that hood 42 is of the character generally employed in conjunction with commercial cooking apparatus to direct rising heat and cooking odors away from the room in which the apparatus is disposed, such as by an exhaust fan and exhaust ducting, not illustrated. Sensing device 30 may be defined by any suitable condition sensing device, a wide variety of which are commercially available. For purposes of the embodiment being described, sensing device 40 is a fusible link of lead or the like which in a well known manner is adapted to be supported in tension and to melt or become structurally weakened when heated to a predetermined temperature denoting the existence of an abnormal temperature condition in the vicinity thereof. When such abnormal temperature is reached element 40 melts or weakens to the extent that the tension applied to the element causes breakage thereof.

Preferably, a fire extinguishing device is associated with cooking apparatus 10 so as to be actuated in response to an abnormal condition to discharge a fire extinguishing substance or composition onto the apparatus. Such fire extinguishing devices may take many forms and may be actuated mechanically or otherwise to achieve the discharge of the fire extinguishing substance upon the occurrence of the abnormal condition. In the embodiment illustrated the fire extinguishing system includes a suitable tank 44 containing a fire extinguishing composition such as $CO_2$ or a foam, for example. Tank 44 is generally disposed in a location remote from the cooking apparatus and may, for example, be mounted on a wall of the establishment in a suitable housing 46. A control valve 48 is associated with tank 44 to control the flow of the fire extinguishing substance therefrom, and a discharge conduit 50 extends from control valve 48 into and across hood 42. Conduit 50 is suitably supported by or relative to hood 42 and is provided with a plurality of discharge openings or nozzles 52 by which the fire extinguishing substance is directed downwardly with respect to the underlying cooking apparatus.

Control valve 48 may be of any suitable structure and operation and, in the embodiment illustrated, is a pivotal valve provided with a suitable actuating arm or lever 54 normally disposed in the solid line position thereof in FIG. 1, in which position the valve is closed against the flow of fire extinguishing substance from tank 44. Lever 54 is normally interconnected with fusible link 40 so as to be maintained in the solid line position. More particularly, one of the opposite ends of link 40 is connected to one end of a flexible cable or chain 56 having its opposite end 58 suitably fixed with respect to hood 42 or a guide conduit 60 through which the cable extends. The other end of fusible link 40 is attached to one end of a flexible cable or chain 62 having its opposite end 64 suitably secured to lever 54. Preferably, cable 62 also extends through a guide conduit 66 leading from hook 42 to housing 46 of the fire extinguishing assembly.

A tension spring 68 has its opposite ends connected one to lever 54 and the other to housing 46 such as by a fixed pin 70. Spring 68 applies tension to cables 56 and 62 and fusible link 40 and applies a biasing force tending to pivot lever 54 toward the broken line position illustrated in FIG. 1. It will be appreciated, therefore, that excessive heat, or fire, in the vicinity of fusible link 40 will melt or so weaken the link that the tension of spring 68 will cause the link to break. When this occurs, the tension of spring 68 biases lever 54 toward the dotted line position thereof to actuate valve 48 so that the fire extinguishing substance in tank 44 is delivered through conduit 50 and thence downwardly with respect to the cooking apparatus through openings 52 in the conduit.

In accordance with the present invention, the sensing of an abnormal, potentially dangerous condition of the foregoing character actuates the safety control circuit to disconnect heating element 18 from power supply 24. In the present embodiment, switch 38 is suitably supported relative to lever 54 so that it is actuated in response to pivotal movement of the lever to the broken line position to open the circuit to coil 36 of contactor 30. More particularly, switch 38 includes a reciprocable plunger 72 adapted to be depressed relative to the switch housing when lever 54 is in the full line position illustrated in FIG. 1. When plunger 72 is so depressed, switch 38 closes the circuit to coil 36. When fusible link 40 breaks and lever 54 is pivoted to the broken line position thereof, switch plunger 72 is biased outwardly of the switch housing, such as by an internal spring, to the broken line position of the plunger, whereby switch 38 opens to de-energize coil 36. As explained hereinabove, de-energization of coil 36 causes displacement of switch arms 32 and 34 to the open position thereof to disconnect heating element 18 from power supply 24.

It will be appreciated that many switch structures can function in the manner described hereinabove with regard to safety control switch 38, and the particular switch structure does not form a part of the present invention. Moreover, it will be appreciated that many arrangements for actuating the switch in response to the breaking of fusible link 40 can be devised, and that the switch can be actuated in a manner similar to that illustrated in FIG. 1 but without a structural interrelationship with a fire extinguishing device. Such a structural interrelationship, however, advantageously facilitates minimizing the cost of assembly and maintenance where fire extinguishing equipment is required.

The ease with which the safety control circuit can be installed for operative association with electric cooking equipment to achieve the desired safety control function will be more readily understood in conjunction with the description of FIG. 2 of the drawing. FIG. 2 schematically illustrates the safety control circuit in conjunction with the internal control circuitry generally provided in commercial electric cooking apparatus such as that designated by the numeral 80. Apparatus 80 may be a range, deep fat fryer or other cooking apparatus and is adapted to be connected to a 220 or 240 volt power source 82 through lines 84 and 86 connected to terminals 88 and 90 of a main power switch 92 of apparatus 80. As an optional feature, a timer 93 may be provided in the internal circuitry. Switch 92 includes terminals 94 and 96 connected by corresponding leads to switch terminals 98 and 100 of coil-controlled contactor 102. Contactor 102 has switch terminals 104 and 106, and heating element 108 of apparatus 80 has its opposite ends connected to terminals 104 and 106. Contactor 102 further includes a coil 110 having its opposite ends connected across a pair of terminals 112 and 114, and coil 110 is operable, when energized, to actuate contactor switch arms 116 and 118 to close the circuit, respectively, between terminals 100 and 106 and terminals 98 and 104 to connect heating element 108 across power supply 82.

The circuitry of cooking apparatus 80 further includes a thermostat 120 connected across the power supply in series with coil 110 of contactor 102. In this respect, thermostat 120 has an input terminal 122 connected by a corresponding lead to terminal 130 of switch 92 and an output terminal 124 connected to terminal 114 of contactor 102. Thermostat 120 further includes an input terminal 126 which, normally, would be connected to terminal 112 of contactor 102, and an output terminal 128 connected to terminal 132 of main switch 92. It will be appreciated, therefore, that normally coil 110 of coil-controlled contactor 102 is energized from the power supply through thermostat 120, whereby heating element 108 is adapted to be energized and de-energized in accordance with selected cooking temperatures as preset by a suitable control dial, not illustrated, associated with the thermostat.

In accordance with the present invention, the safety control circuit is connected in series with thermostat 120 and coil 110 of contactor 102 and, more particularly, between input terminal 126 of thermostat 120 and terminal 112 of contactor 102. Thus, the desired capability of disconnecting the heating element in an emergency situation is achieved without disrupting the capability of the thermostat to control normal energization and de-energization of the heating element during a cooking operation. The safety control circuit includes a first pair of leads 134 and 136. Lead 134 has a first end connected to terminal 112 of contactor 102, and lead 136 has a first end connected to input terminal 126 of thermostat 120. The other ends of leads 134 and 136 are connected to a respective one of a pair of contact fingers in the female member 138 of a standard disconnect coupling. The safety control circuit further includes a second pair of leads 140 and 142 having corresponding ends connected to a respective one of the contact fingers of male component 144 of the disconnect coupling. The other ends of leads 140 and 142 are connected to the terminals of a normally closed safety control switch 146 which corresponds functionally to switch 38 described hereinabove in conjunction with FIG. 1. In accordance with the latter description, it will be appreciated that switch 146 includes an actuating member 148 operatively interconnected with an adverse condition sensing element 150 so that the switch is operable in response to the sensing of an adverse condition to open the circuit between leads 140 and 142.

Assuming switch 146 to be in its normally closed position, it will be appreciated from the foregoing description that coil 110 of coil-controlled contactor 102 is energized through the safety control circuit. So long as switch 146 remains closed, thermostat 120 is operable to control energization and de-energization of coil 110 of contactor 102, whereby heating element 108 can be energized and de-energized in accordance with the requirements of a cooking operation. Upon the sensing of an adverse condition by sensing device 150, actuating member 148 of switch 146 is displaced to open switch 146, whereby the circuit to coil 110 of contactor 102 is interrupted, the coil de-energized and contactor arms 116 and 118 displaced to the open positions thereof to disconnect heating element 108 from the power supply. When so de-energized, coil 110 cannot again be energized to connect heating element 108 across the power supply until such time as safety control switch 146 is reclosed.

It will be seen from the foregoing description that the safety control circuit is extremely simple, requires a minimum number of operating parts and is readily connected with existing circuitry in electrical cooking apparatus. In this respect, it is only necessary to electrically connect the ends of leads 134 and 136 to existing terminals in the apparatus, to associate the safety control switch 146 with a suitable condition sensing device for the switch to be mechanically actuated, and to couple the leads from the cooking apparatus and switch, preferably by a separable coupling assembly. The latter advantageously provides for the switch to be disposed in any desired location relative to the cooking apparatus for actuation in response to the sensing of an adverse condition and for the leads from the switch and cooking apparatus to be readily disconnected to facilitate movement of the apparatus such as for repair or replacement purposes without interferring with the switch mounting.

It is to be noted that the components of the separable coupling assembly are associated with the safety control circuit in a manner whereby the female component of the coupling assembly is connected to the leads from the cooking apparatus. This advantageously provides protection against the possibility of exposed "hot" contacts when the coupling elements are separated.

While considerable emphasis has been placed herein on the fact that the safety control switch has a reciprocable plunger or actuating member, it will be appreciated that switches having other actuating arrangements, such as toggle type actuators, can readily be employed. Further, it will be appreciated that many arrangements can be devised for achieving mechanical actuation of the switch in response to the sensing of an adverse condition, so as to achieve de-energization of the contactor controlling connection of the heating element to the power supply. Further, it will be appreciated that condition sensing arrangements other than a fusible link can be employed in the safety control circuit, it only being necessary that the condition sensing device be operable to open the safety control switch to achieve the desired disconnection of the heating element from the power supply. It will be further appreciated that the safety control switch can be employed alone as opposed to being employed in conjunction with a fire extinguishing system and that, when employed with a fire extinguishing system, can be structurally associated therewith in a manner other than that illustrated and described herein.

As many possible embodiments of the present invention may be made and as many possible changes may be made in the embodiments herein illustrated and described, it is to be distinctly understood that the foregoing descriptive matter is to be interpreted merely as illustrative of the present invention and not as a limitation.

Having thus described my invention, I claim:

1. A disconnect arrangement for electric cooking apparatus having an electrically energizable heating element connectable across a power supply for energization and an internal control circuit for controlling connection of the heating element across the power supply, said internal control circuit being connected across the power supply and including electrically actuable contactor means operable when energized to connect said heating element across said power supply, said disconnect arrangement including a normally closed circuit connected in series with said contactor means across said power supply for said contactor means to be energized through said normally closed circuit, said normally closed circuit including normally closed switch means, sensing means located remotely with respect to the cooking apparatus to sense an abnormal condition exteriorly thereof, and switch actuating means responsive to the sensing of said abnormal condition to open said normally closed switch means in said normally closed circuit to de-energize said contactor means in said internal control circuit and thus disconnect said heating element from said power supply.

2. The disconnect arrangement according to claim 1, wherein said sensing means includes fuse means rupturable when exposed to an abnormal high temperature, and said switch actuating means responsive to the sensing of said abnormal condition includes lever means actuated in response to rupturing of said fuse means to open said switch means.

3. The disconnect arrangement according to claim 1, and connector coupling means separably interconnecting said switch means in said normally closed circuit.

4. The disconnect arrangement according to claim 2, and fire extinguishing means including a container for a fire extinguishing substance, said lever means actuated in response to rupturing of said fuse means actuating said fire extinguishing means to discharge said substance from said container.

5. The disconnect arrangement according to claim 1, and means supporting said switch means in a location remote with respect to said cooking apparatus, said sensing means being a fuse rupturable when exposed to an abnormal high temperature, and said switch actuating means responsive to the sensing of said abnormal condition including mechanical means interconnecting said fuse and switch means and operable in response to rupturing of said fuse to actuate said switch means to open said normally closed circuit.

6. The disconnect arrangement according to claim 5, wherein said normally closed circuit includes conductor means between said switch means and cooking apparatus, and a separable electrical coupling interconnecting said conductor means intermediate said switch means and cooking apparatus.

7. A disconnect arrangement for electric cooking apparatus having an electrically energizable heating element connectable across a power supply for energization and an internal control circuit for controlling connection of the heating element across the power supply, said internal control circuit being connected across the power supply and including electrically actuable contactor means operable when energized to connect said heating element across said power supply, said disconnect arrangement including a normally closed circuit connected in series with said contactor means across said power supply for said contactor means to be energized through said normally closed circuit, sensing means located remotely with respect to the cooking apparatus to sense an abnormal condition exteriorly thereof, means responsive to the sensing of said abnormal condition to open said normally closed circuit to de-energize said contactor means and thus disconnect said heating element from said power supply, said means responsive to the sensing of said abnormal condition including normally closed switch means in said normally closed circuit, and means supporting said switch means at a location remote from said cooking apparatus, said sensing means being a fuse rupturable when exposed to an abnormal high temperature, and said means responsive to the sensing of said abnormal condition further including arm means interconnected with said supporting means for movement relative to said switch means between first and second positions, means interconnecting said arm means and fuse for said fuse to releaseably hold said arm means in said first position, and means to move said arm means to said second position upon rupturing of said fuse, said arm means being operatively associated with said switch means for said switch means to open said normally closed circuit when said arm means moves to said second position.

8. The disconnect arrangement according to claim 7, and fire extinguishing means including a valve controlled container for a fire extinguishing substance supported by said supporting means, said arm means being operable when moved from said first to said second position to open said valve controlled container to discharge said substance therefrom.

9. A disconnect arrangement for electric cooking apparatus having an electrically energizable heating element connectable across a power supply for energization and an internal control circuit for controlling connection of the heating element across the power supply, said internal control circuit being connected across the power supply and including electrically actuable contactor means operable when energized to connect said heating element across said power supply, said disconnect arrangement including a normally closed circuit connected in series with said contactor means across said power supply for said contactor means to be energized through said normally closed circuit, sensing means located remotely with respect to the cooking apparatus to sense an abnormal condition exteriorly thereof, means responsive to the sensing of said abnormal condition to open said normally closed circuit to de-energize said contactor means and thus disconnect said heating element from said power supply, said contactor means being a coil-controlled contactor, said internal control circuit for said cooking apparatus including a thermostat and said normally closed circuit being between and in series with said thermostat and the coil of said contactor, said means responsive to the sensing of said abnormal condition including normally closed switch means in said normally closed circuit, said normally closed circuit further including first and second pairs of conductors, said first pair of conductors having first ends connected one to said coil and the other to said thermostat and having second ends, said second pair of conductors having first ends connected to said switch means and having second ends, a male plug connected to the second ends of said second pair of conductors, a female socket connected to said second ends of said first pair of conductors, and said plug and socket being cooperable to releaseably connect said switch means from the remaining portion of said normally closed circuit.

10. The disconnect arrangement according to claim 9, wherein said sensing means includes fuse means rupturable when exposed to an abnormal high temperature, and said means responsive to the sensing of said abnormal condition includes means actuated in response to rupturing of said fuse means to open said switch means.

11. The disconnect arrangement according to claim 9, and means supporting said switch means in a location remote with respect to said cooking apparatus, said switch means being actuatable to open said normally closed circuit, said sensing means being a fuse rupturable when exposed to an abnormal high temperature, and said means responsive to the sensing of said abnormal condition including mechanical means between said fuse and switch means operable in response to rupturing of said fuse to actuate said switch means to open said circuit.

12. The disconnect arrangement according to claim 10, and fire extinguishing means including a container for a fire extinguishing substance, said means actuated in response to rupturing of said fuse means including means to actuate said fire extinguishing means to discharge said substance from said container.

* * * * *